(12) United States Patent
McMahon

(10) Patent No.: US 10,024,387 B2
(45) Date of Patent: Jul. 17, 2018

(54) WHEEL BALANCING WEIGHT AND METHOD OF MANUFACTURE

(71) Applicant: Wegmann Automotive USA Inc., Murfreesboro, TN (US)

(72) Inventor: Charles Robert McMahon, Murfreesboro, TN (US)

(73) Assignee: Wegman Automotive USA Inc., Murfreesboro, TN (US)

( * ) Notice: Subject to any disclaimer, the term of this patent is extended or adjusted under 35 U.S.C. 154(b) by 29 days.

(21) Appl. No.: 14/807,832

(22) Filed: Jul. 23, 2015

(65) Prior Publication Data

US 2016/0025185 A1    Jan. 28, 2016

Related U.S. Application Data

(63) Continuation-in-part of application No. 13/848,394, filed on Mar. 21, 2013, now Pat. No. 9,228,634.

(Continued)

(51) Int. Cl.
*F16F 15/32* (2006.01)
*F16F 15/34* (2006.01)

(52) U.S. Cl.
CPC .......... *F16F 15/324* (2013.01); *F16F 15/345* (2013.01); *Y10T 29/49826* (2015.01)

(58) Field of Classification Search
CPC ........... F16F 15/32; F16F 15/34; F16F 15/324
See application file for complete search history.

(56) References Cited

U.S. PATENT DOCUMENTS

| 2,036,757 A | 4/1936 | Hume |
| 2,049,918 A | 8/1936 | Marsh |

(Continued)

FOREIGN PATENT DOCUMENTS

| CN | 101162036 | 4/2008 |
| CN | 101596835 | 12/2009 |

(Continued)

OTHER PUBLICATIONS

International Search Report and Written Opinion, from PCT/US2013/033260, dated Jun. 4, 2013.

(Continued)

*Primary Examiner* — Jason R Bellinger
(74) *Attorney, Agent, or Firm* — Lempia Summerfield Katz LLC

(57) ABSTRACT

A wheel balancing weight has a mass body with a groove in a first face. The groove has a groove surface recessed into the first surface and has two groove walls opposite one another across the groove. An attachment clip has a clip portion for attaching the wheel balancing weight to a vehicle wheel and has an attachment portion with first and second side edges opposite one another across the attachment portion. First and second protruding elements are provided on the first and second side edges, respectively. The attachment portion is seated in the groove and has a free bottom edge extending between the first and second side edges. The first protruding element is positioned on the first side edge at a first distance from the bottom edge and the second protruding element is positioned on the second side edge at a second distance different from the first distance. Material of the mass body adjacent the two groove walls is deformed to retain the attachment portion in the groove.

6 Claims, 10 Drawing Sheets

Related U.S. Application Data

(60) Provisional application No. 61/613,862, filed on Mar. 21, 2012.

(56) References Cited

U.S. PATENT DOCUMENTS

| | | | |
|---|---|---|---|
| 2,065,633 A | 12/1936 | Van Halteren | |
| 2,122,065 A | 6/1938 | Hume | |
| 2,137,415 A | 11/1938 | Rubsam | |
| 2,137,416 A | 11/1938 | Rubsam | |
| 2,197,364 A | 4/1940 | Hatch | |
| 2,202,129 A | 5/1940 | Turner | |
| 2,221,747 A | 11/1940 | Turner | |
| 2,231,948 A | 2/1941 | Rickey | |
| 2,248,265 A | 7/1941 | Wright | |
| 2,258,011 A | 10/1941 | Inman | |
| 2,359,248 A | 9/1944 | Rubsam | |
| 2,522,039 A | 9/1950 | Jacobsen et al. | |
| 2,548,842 A | 4/1951 | McCrorey | |
| 2,576,724 A | 11/1951 | Pouell | |
| 2,696,408 A | 12/1954 | Merriman | |
| 2,775,487 A | 12/1956 | Hennecke | |
| 2,847,250 A | 8/1958 | Hennecke | |
| 2,926,953 A | 3/1960 | Lyon | |
| 2,926,955 A | 3/1960 | Lyon | |
| 3,011,828 A | 12/1961 | Karig | |
| 3,056,631 A | 10/1962 | Mills | |
| 3,336,083 A | 8/1967 | Chatain et al. | |
| 3,633,263 A | 1/1972 | Hoeksema | |
| 3,669,500 A | 6/1972 | Ende | |
| 3,688,380 A | 9/1972 | Hofmann et al. | |
| 4,728,154 A | 3/1988 | Boyle et al. | |
| 5,288,754 A | 2/1994 | Woodward et al. | |
| 5,733,016 A | 3/1998 | Brown | |
| 6,238,005 B1 | 5/2001 | Sugayauchi et al. | |
| 6,250,721 B1 | 6/2001 | Oba et al. | |
| 6,364,422 B1 | 4/2002 | Sakaki et al. | |
| 6,592,188 B2 | 7/2003 | Yamaguchi | |
| 6,698,845 B2 | 3/2004 | Corte et al. | |
| 6,948,781 B2 | 9/2005 | Sery | |
| 7,055,914 B1 | 6/2006 | Jenkins et al. | |
| 7,093,907 B2 | 8/2006 | Jenkins et al. | |
| 7,216,938 B2 | 5/2007 | Phillips | |
| 7,249,804 B2 | 7/2007 | Zank et al. | |
| 7,566,101 B2 | 7/2009 | Jenkins et al. | |
| 7,818,868 B2 | 10/2010 | Chancharoen et al. | |
| 8,066,335 B2 | 11/2011 | Jenkins et al. | |
| 9,228,634 B2 * | 1/2016 | McMahon | F16F 15/324 |
| 2004/0007912 A1 | 1/2004 | Amyot et al. | |
| 2005/0062332 A1 | 3/2005 | Amyot et al. | |
| 2006/0138854 A1 | 6/2006 | Le Moal et al. | |
| 2007/0120414 A1 | 5/2007 | Jenkins et al. | |
| 2008/0042486 A1 | 2/2008 | Malbos | |
| 2008/0088173 A1 | 4/2008 | Chancharoen | |
| 2009/0230757 A1 | 9/2009 | Chancharoen | |
| 2009/0278397 A1 | 11/2009 | Jenkins et al. | |
| 2011/0204704 A1 | 8/2011 | Halle et al. | |
| 2011/0266862 A1 | 11/2011 | Halle et al. | |
| 2012/0062018 A1 | 3/2012 | Jenkins et al. | |
| 2012/0062019 A1 | 3/2012 | Jenkins et al. | |
| 2013/0134766 A1 | 5/2013 | Ford et al. | |

FOREIGN PATENT DOCUMENTS

| | | |
|---|---|---|
| DE | 3118222 | 11/1982 |
| EP | 0994274 | 4/2000 |
| EP | 1113188 A1 | 7/2001 |
| EP | 1398522 A1 | 3/2004 |
| EP | 2088350 A1 | 8/2009 |
| JP | 11063112 | 3/1999 |
| JP | 11201235 | 7/1999 |
| JP | 11257435 | 9/1999 |
| JP | 11294541 | 10/1999 |
| JP | H11294541 A | 10/1999 |
| JP | 2000120793 A | 4/2000 |
| JP | 2000145894 | 5/2000 |
| JP | 2001050350 | 2/2001 |
| JP | 2001248691 | 9/2001 |
| JP | 2002054686 | 2/2002 |
| JP | 2002276739 | 9/2002 |
| JP | 2004084715 | 3/2004 |
| JP | 2004092685 | 3/2004 |
| JP | 2005147267 | 6/2005 |
| JP | 2005291262 | 10/2005 |
| JP | 2005291262 A | 10/2005 |
| JP | 2006153079 | 6/2006 |
| JP | 2008164051 | 7/2008 |
| JP | 2011012775 | 1/2011 |
| KR | 102007004224 | 4/2007 |

OTHER PUBLICATIONS

Supplementary European Search Report cited in EP13764926, dated Feb. 15, 2016.

Japan Patent Office; Office Action; dated Dec. 5, 2016; JP Pat. Appl. No. 2015-501905; Japan.

* cited by examiner

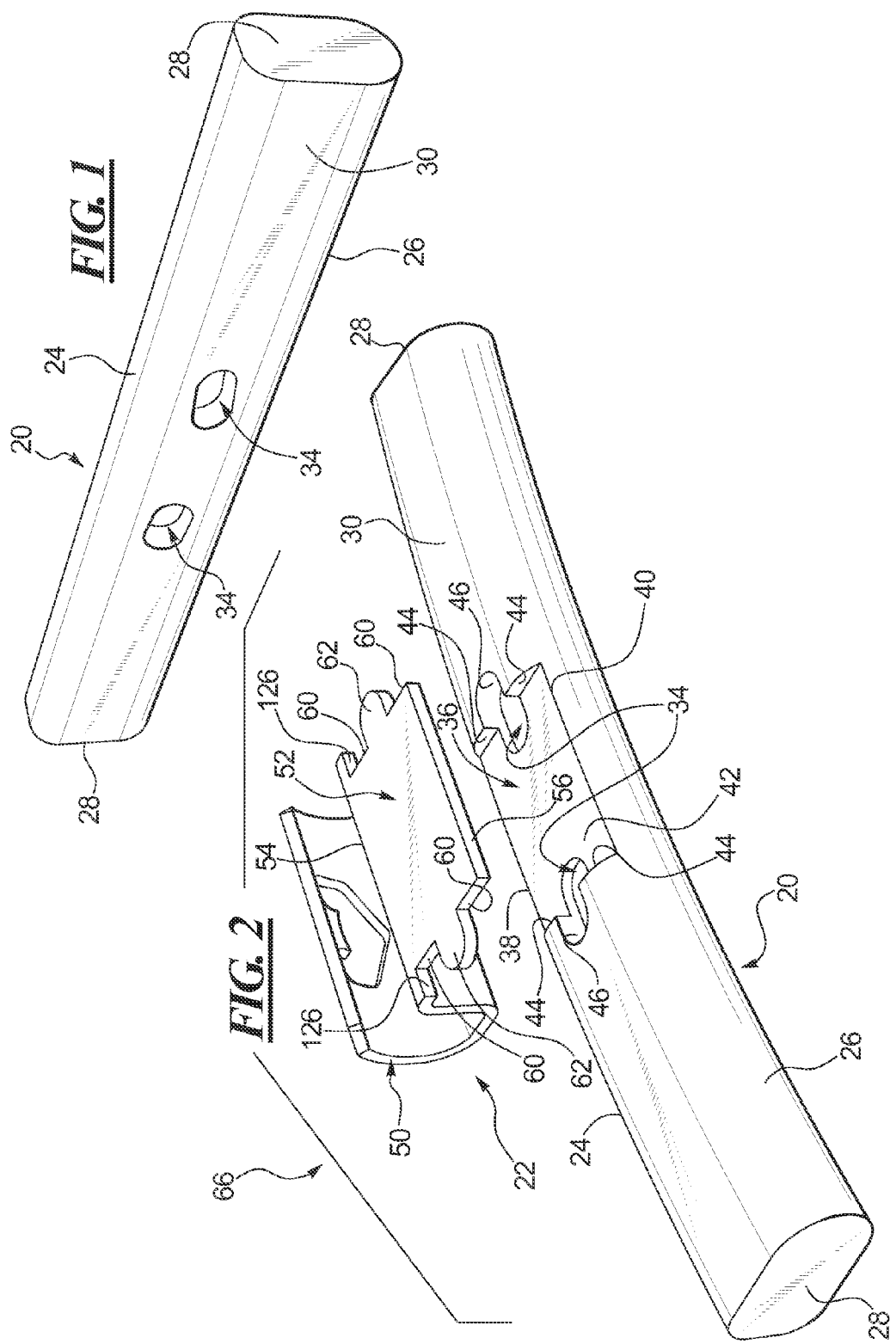

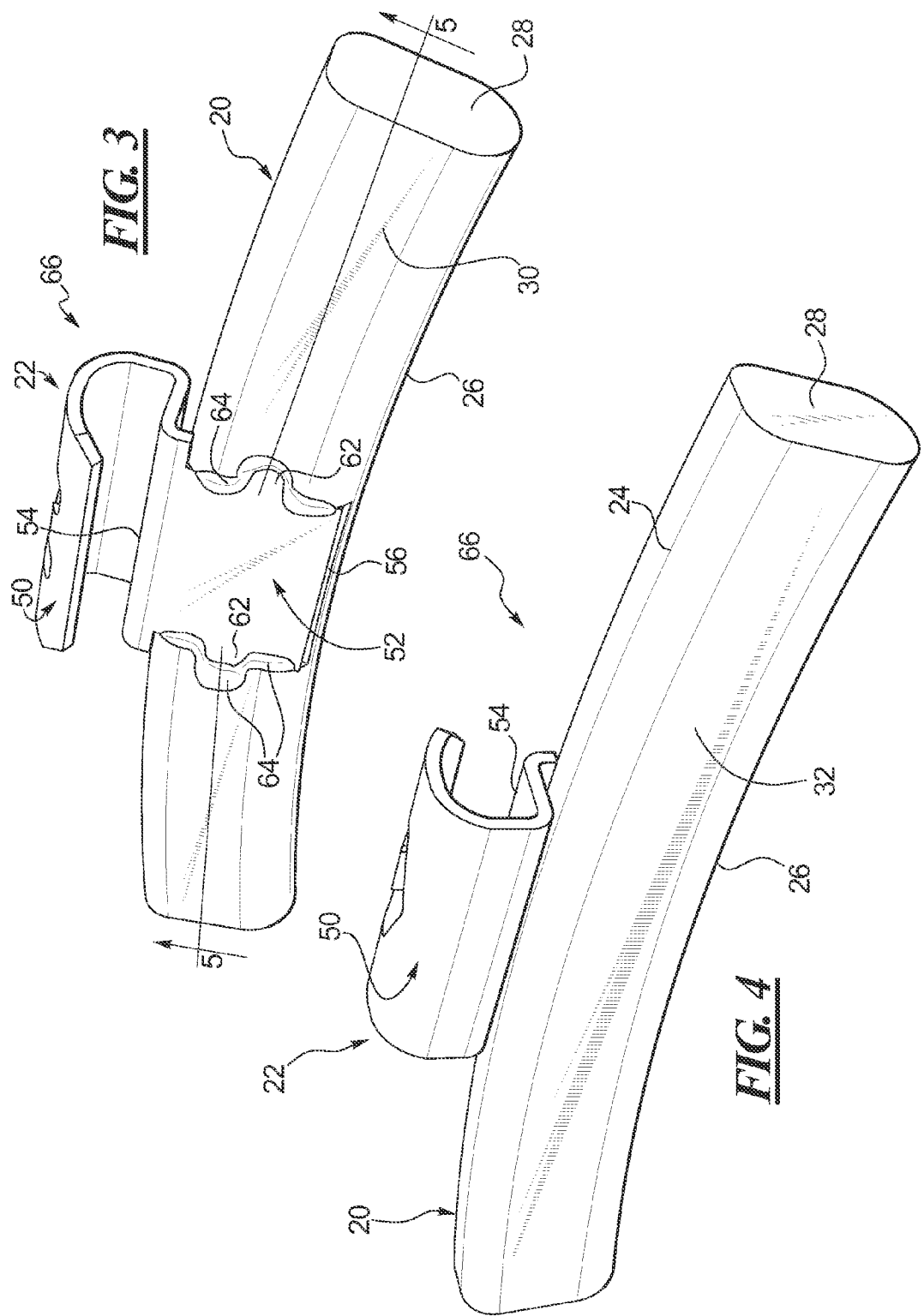

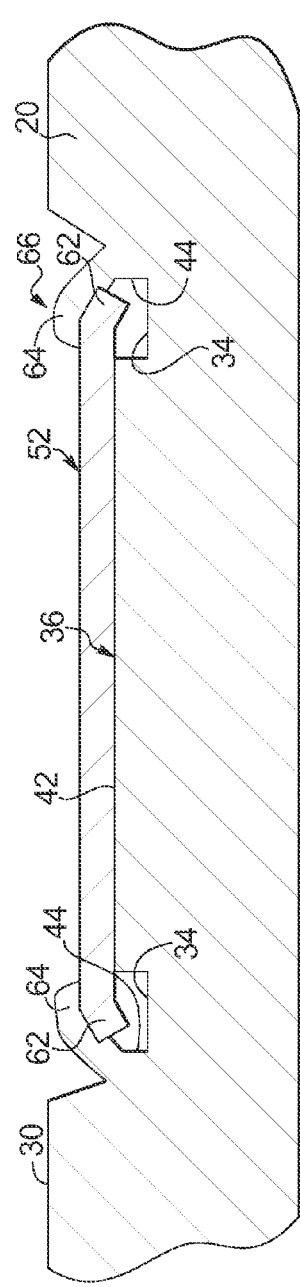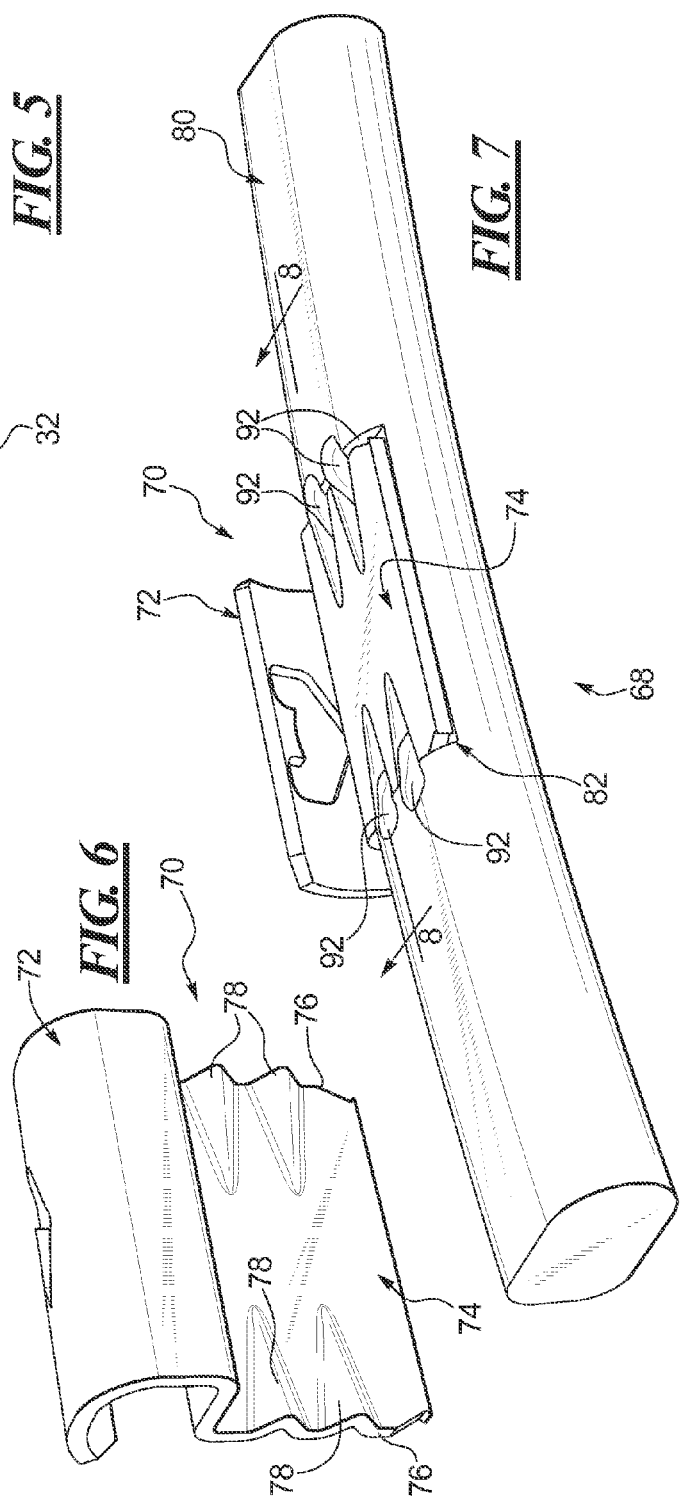

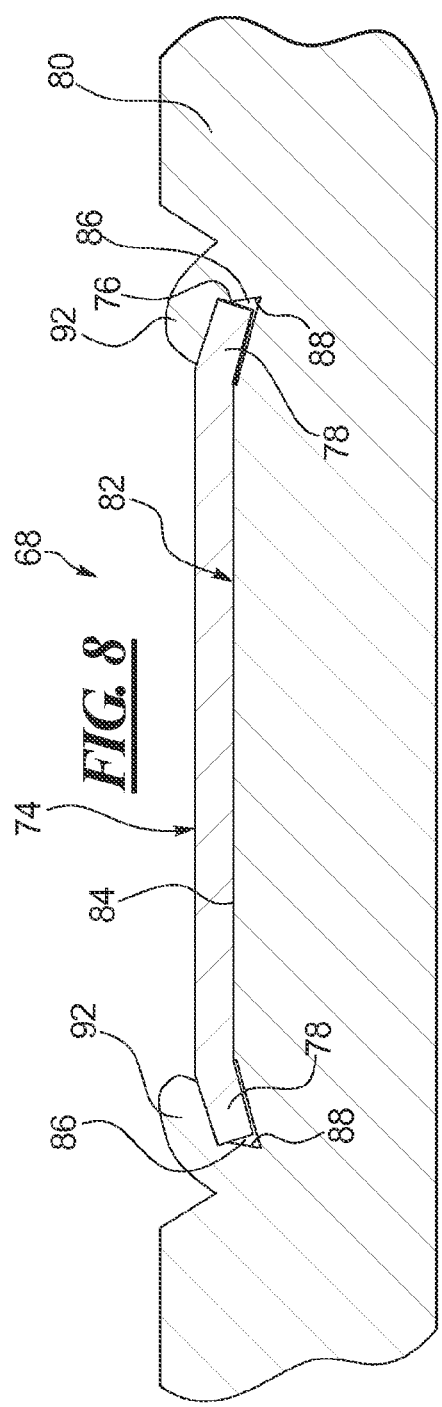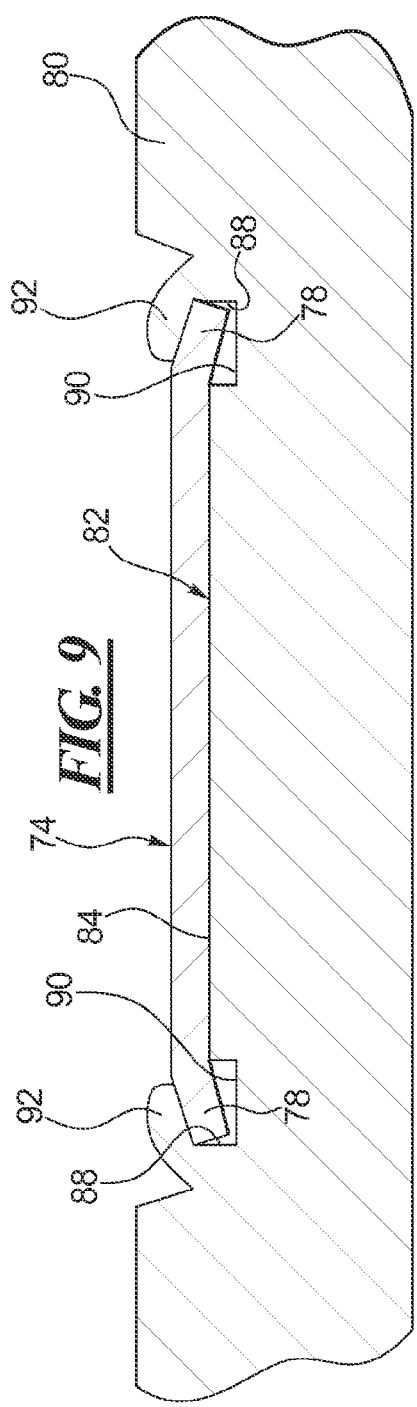

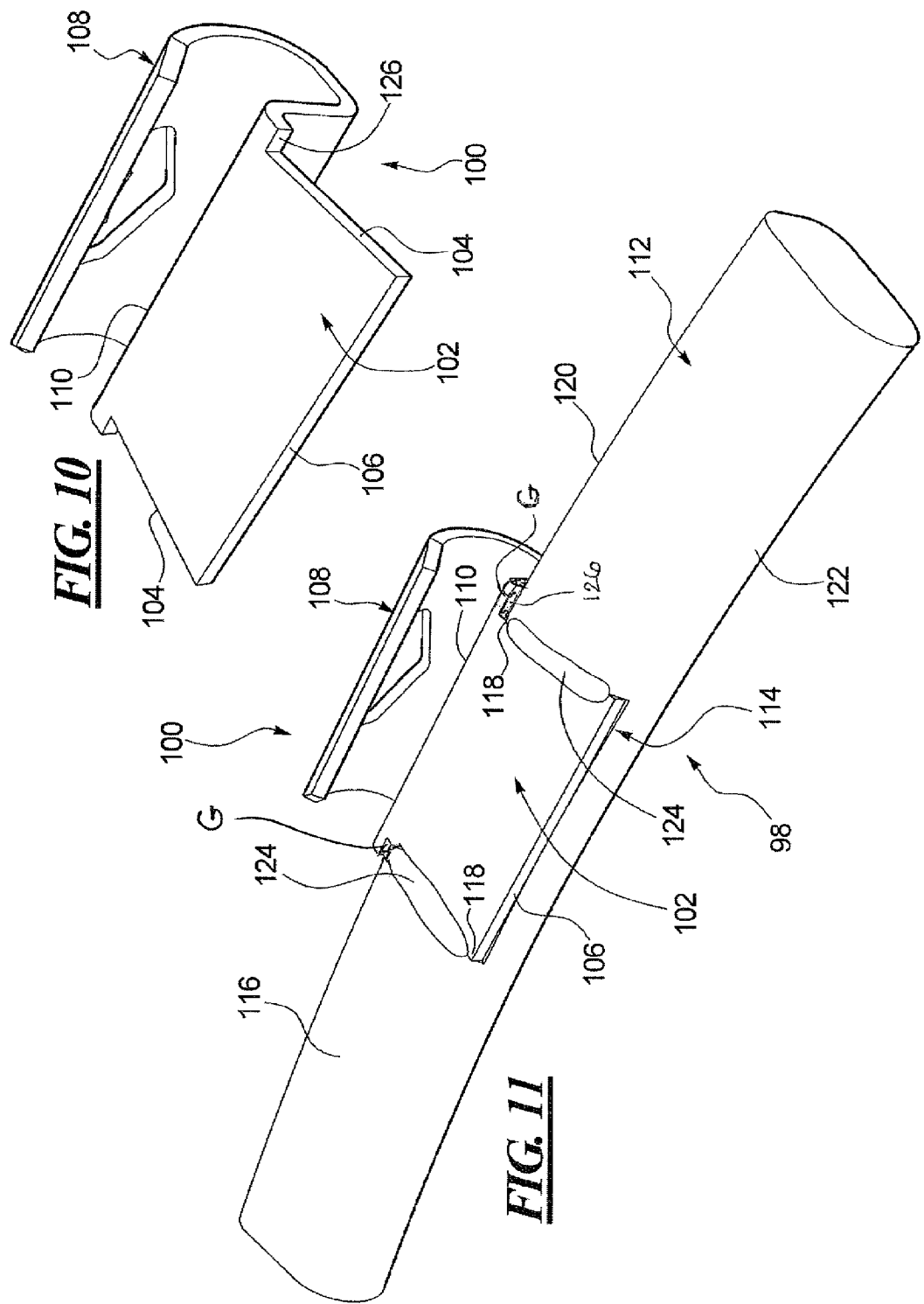

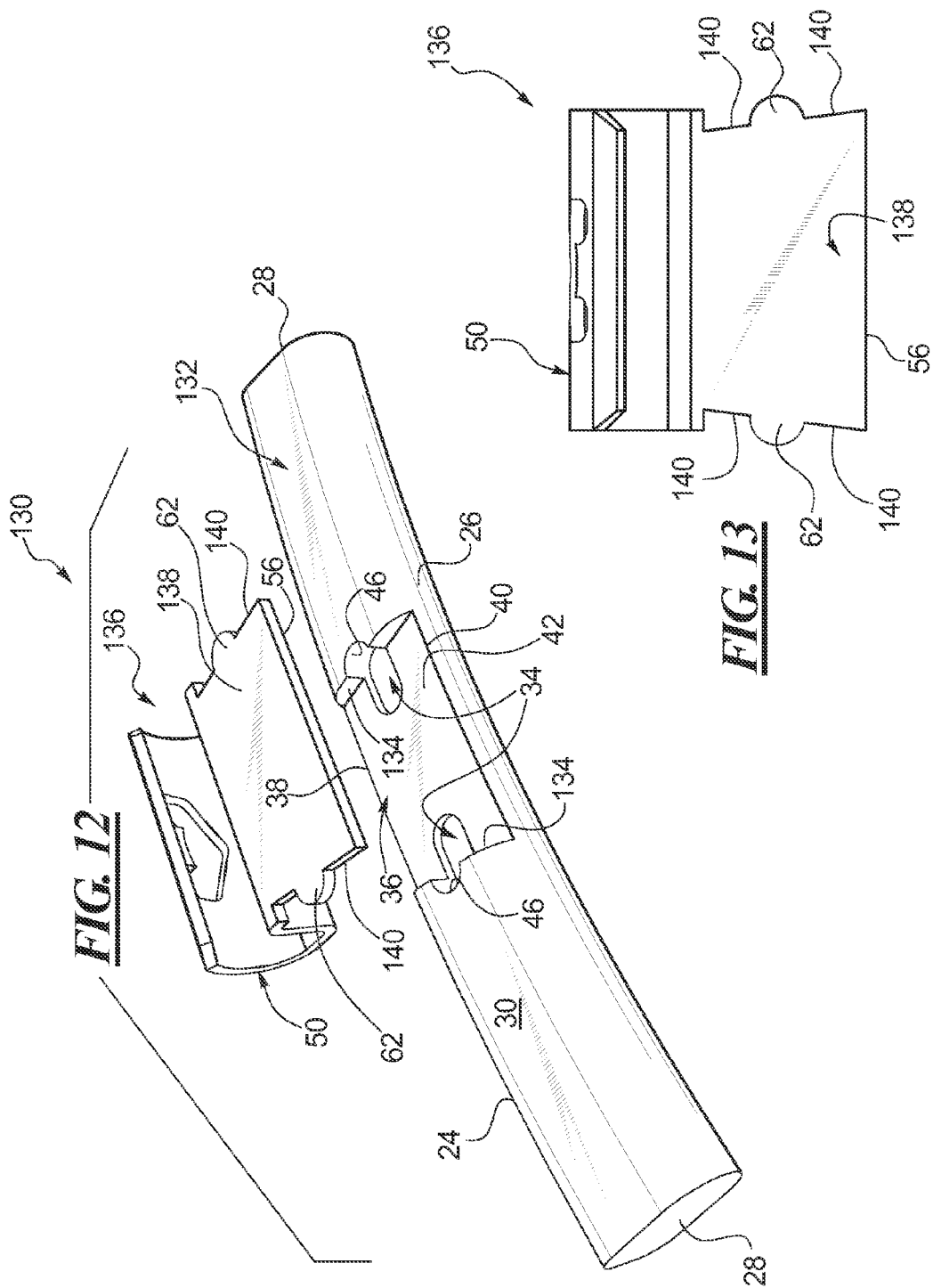

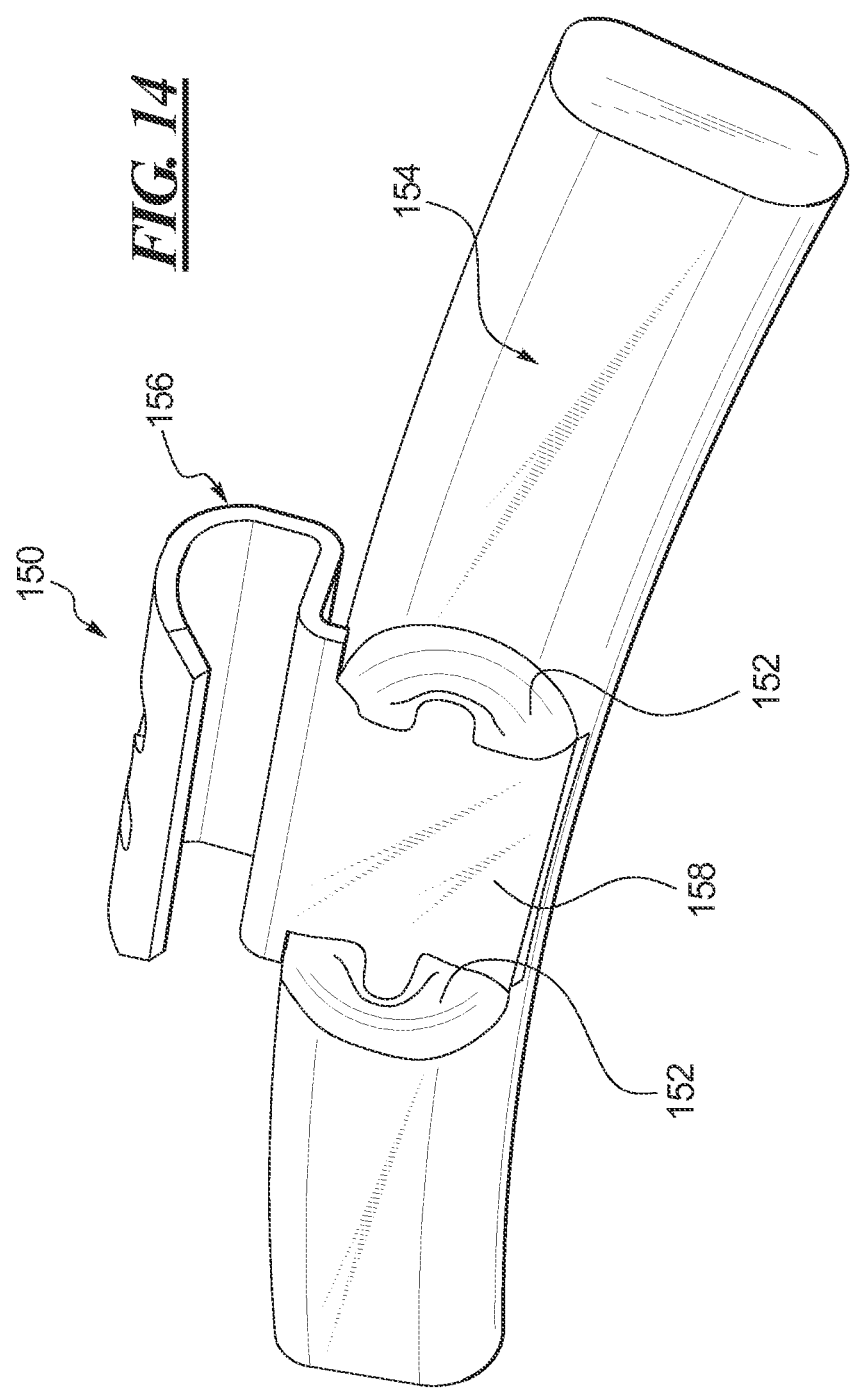

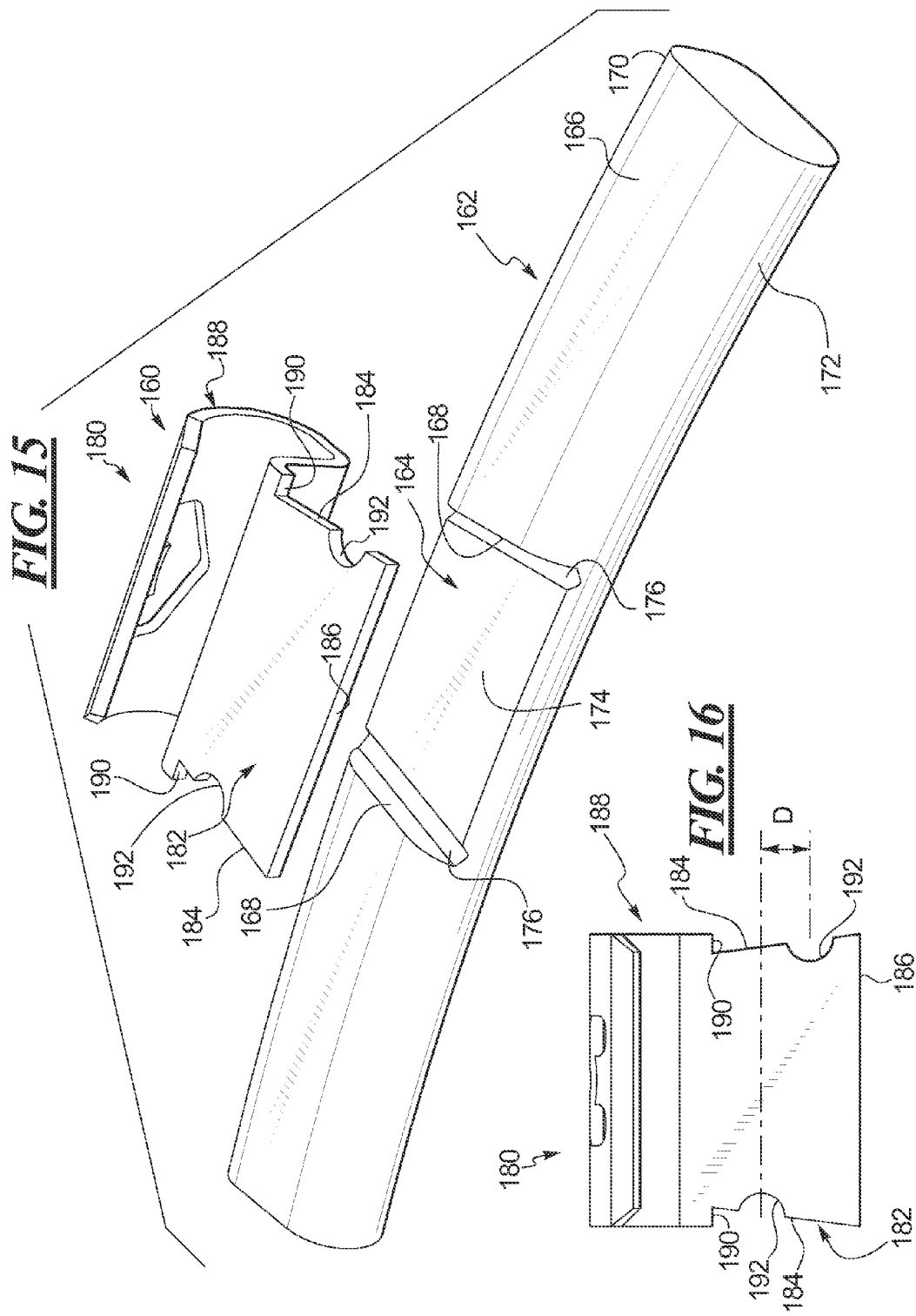

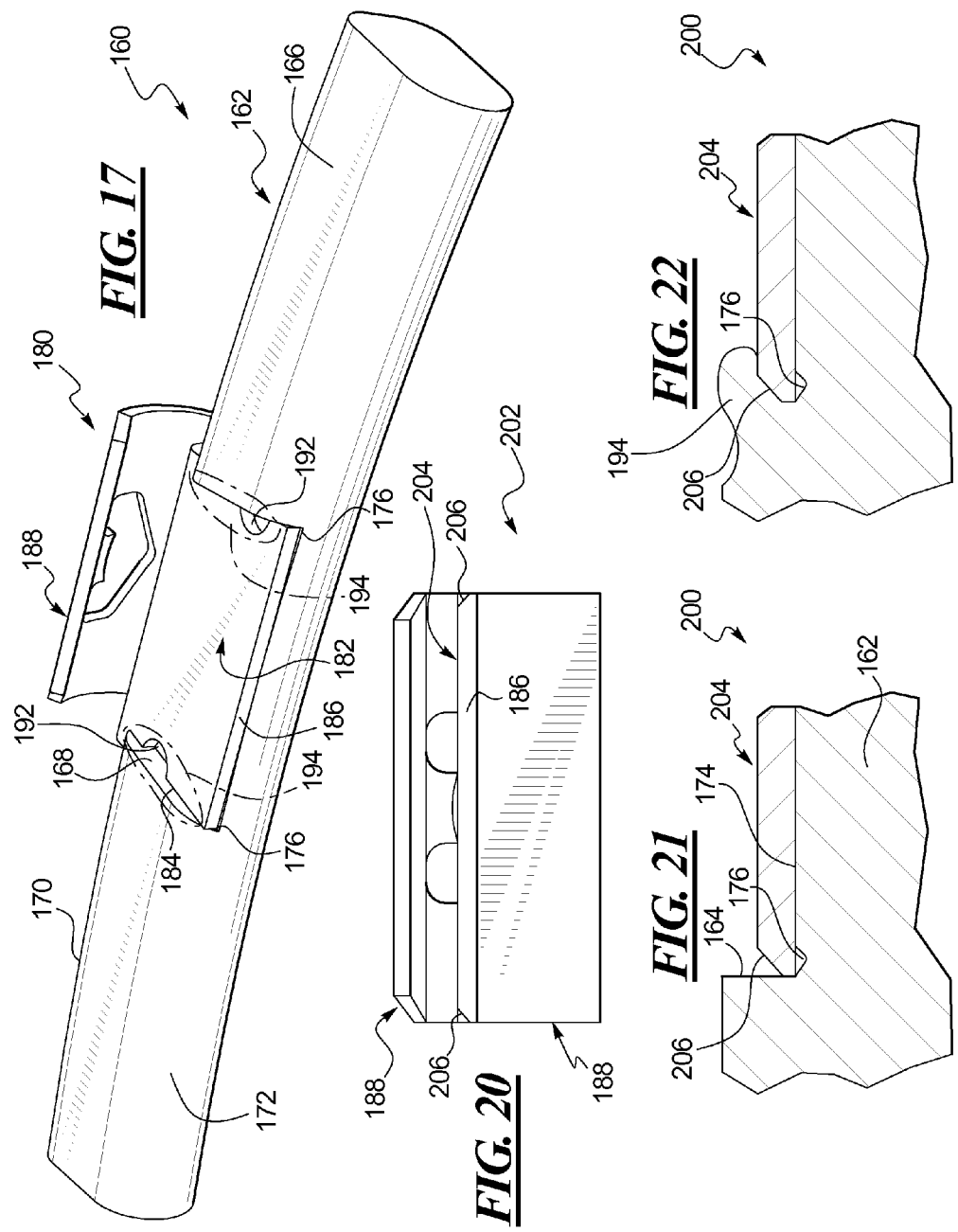

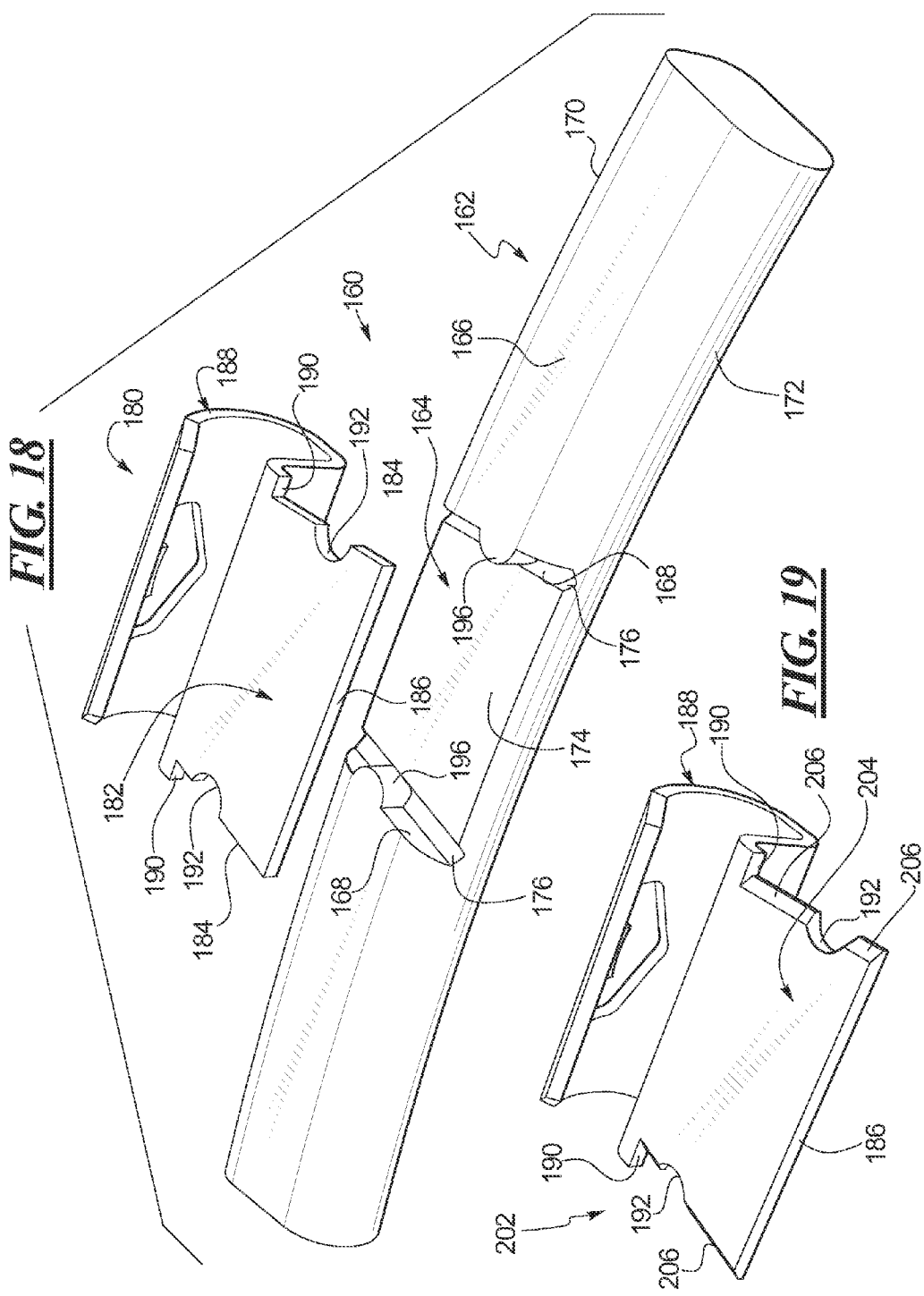

WHEEL BALANCING WEIGHT AND METHOD OF MANUFACTURE

RELATED APPLICATION DATA

This application is a continuation-in-part of U.S. application Ser. No. 13/848,394 filed on March 21 and entitled "Wheel Balancing Weight and Method of Manufacture," which is now issued as U.S. Pat. No. 9,228,634, and which claimed priority benefit of U.S. provisional application Ser. No. 61/613,862 filed on Mar. 21, 2012 and entitled "Wheel Weight Construction and Method of Manufacture." The entire contents of these prior filed applications are hereby incorporated by reference herein.

BACKGROUND

1. Field of the Disclosure

The present disclosure is generally directed to vehicle wheel balancing weights, and more particularly to attachment arrangements and methods for joining and securing a mounting clip and a mass body of a wheel balancing weight for vehicular tire and wheel assemblies.

2. Description of Related Art

There are many different types and designs of balancing weights for vehicle wheels. Most such wheel weights have a weighted body or mass body that is provided in a specific weight to offset a rolling weight imbalance in a wheel rim and tire assembly. These types of wheel weights are typically mounted to part of the wheel rim. Many wheel weights have a mounting clip or attachment clip that is connected to the mass body. The attachment clip is also configured to attach or mount the wheel weight to the wheel rim.

There are many different known attachment or joint configurations and manufacturing methods to connect a mounting clip to a mass body when assembling or creating a wheel balancing weight. When the mass body and attachment clip are formed as two separate components and assembled, the joint or connection should be substantial and strong enough so that the two parts do not detach from one another during normal use. The joint or connection between the two components should be strong and durable in multiple force directions, depending on the joint arrangement.

The attachment clip is also typically used to attach the wheel weight to a rim flange of the vehicle wheel rim. However, some wheel weights attach to the wheel rim at other locations and by other means, such as by adhesive. The mass bodies are typically positioned to add a specified, predetermined amount of weight or mass to a circumferentially specific point on a wheel rim to counter any imbalance in the wheel, tire, or both.

One general type of attachment method and joint construction for a wheel weight is known and commonly used. This method and joint construction includes forming a recessed groove in a face of a mass body. The attachment clip is formed having a clip portion with an attachment or mounting portion that is sized to fit and seat in the groove. It is known that the attachment portion and mass body can be adhered, joined, or otherwise affixed to one another. In some wheel weights, the attachment portion can be welded to the mass body within the groove.

In other wheel weights, the material adjacent the walls defining the groove in the mass body can be swaged, stamped, crimped, pressed, or otherwise worked. The mass body can be worked so as to cause material of the mass body adjacent the groove to flow and overlie and/or interfere with parts of the attachment portion. In some wheel weight designs, it is known to provide the attachment portion with teeth or indentations that engage similar shapes or flowed or worked material on the mass body to secure the two components together.

SUMMARY

In one example according to the teachings of the present invention, a wheel balancing weight has a mass body with a first face having a first surface and a second face opposite the first face. A groove is provided in the first face and has a groove surface recessed to a groove depth relative to the first surface. The groove has two groove walls that oppose one another across the groove to define lateral boundaries of the groove and that extend between the groove surface and the first surface. Two slots are formed partly into the groove surface, each slot near a respective groove wall of the two groove walls. Each slot has a slot depth into the mass body greater than the groove depth. An attachment clip has a clip portion configured to attach the wheel balancing weight to a vehicle wheel. The attachment clip has an attachment portion with two side edges that are opposite one another across the attachment portion. Two protruding elements are provided on a respective side edge of the two side edges on the attachment portion. The two protruding elements extend out of plane relative to a plane of the attachment portion. The attachment portion is seated in the groove against the groove surface between the two groove walls such that the two protruding elements extend at least partly into the two slots to a depth beyond the groove depth of the groove surface. Material of the mass body adjacent each groove wall is deformed and overlies a portion of the respective side edge on the attachment portion and a portion of each protruding element on the attachment portion.

In one example, the two slots can be disposed only within the groove adjacent the two groove walls. The two protruding elements can seat in the two slots.

In one example, each slot can be a blind slot.

In one example, each slot can be a blind slot with an angled or tapered depth that decreases away from the respective groove wall. Each protruding element can have a corresponding shape and can be deeper nearer the respective side edge of the attachment portion.

In one example, each slot can be a blind slot and can be disposed only within the groove adjacent the respective groove wall and can have an angled or tapered depth that is greater nearer the respective groove wall.

In one example, the two protruding elements can be pyramid shaped elements.

In one example, the two protruding elements can be pyramid shaped and can seat in the two slots, which can be blind slots.

In one example, the two protruding elements can be constructed so as to not extend laterally outward beyond the two side edges of the attachment portion.

In one example, the two protruding elements can be constructed so as to not be aligned with one another across the attachment portion.

In one example, the two side edges can each have a tapered edge profile.

In one example according to the teachings of the present disclosure, a wheel balancing weight has a mass body with a first face having a first surface and a second face opposite the first face. A groove in the first face has a groove surface recessed to a groove depth relative to the first surface. The groove has two groove walls that oppose one another across the groove to define lateral boundaries of the groove and that extend between the groove surface and the first surface. An attachment clip has a clip portion configured to attach the wheel balancing weight to a vehicle wheel. The attachment clip has an attachment portion with a first side edge and a second side edge that are opposite one another across the attachment portion. A first protruding element and a second protruding element are provided on the first and second side edges, respectively, on the attachment portion. The attachment portion is seated in the groove against the groove surface between the two groove walls. The attachment portion of the attachment clip has a free bottom edge extending between the first and second side edges. The first protruding element is positioned on the first side edge at a first distance from the bottom edge and the second protruding element is positioned on the second side edge at a second distance different from the first distance. Material of the mass body adjacent the two groove walls is deformed and overlies a portion of the first and second side edges and a portion of the first and second protruding elements on the attachment portion.

In one example, the two groove walls of the groove can be generally parallel to one another.

In one example, the first and second side edges of the attachment portion can be constructed so as to not be parallel to one another.

In one example, the first and second side edges of the attachment portion can be closer to one another nearer clip portion and further away from one another nearer the free bottom edge.

In one example, the two groove walls of the groove can be closer to one another across the groove nearer the clip portion and further apart from one another across the groove nearer the free bottom edge of the attachment portion.

In one example, the attachment portion can be trapezoid shaped and the groove can be correspondingly trapezoid shaped.

In one example, the first and second protruding elements can each be an indentation that protrudes into the first and second side edges, respectively.

In one example, the first and second protruding elements can each be a semicircular notch or cutout.

In one example, the first and second side edges can each have a tapered edge profile.

In one example, the wheel balancing weight can include two slots. Each slot of the two slots can have a slot depth into the mass body greater than the groove depth. Each slot can be formed partly into the groove surface inward of a respective groove wall of the two groove walls and can have a respective recessed segment that extends partly into the mass body laterally outward beyond the respective groove wall. The first and second protruding elements can each extend at least partly into the two slots to a depth beyond the groove depth of the groove surface and laterally into the respective recessed segment.

In one example, the wheel balancing weight can have two slots and the first and second protruding elements can be tabs aligned with and bent at least partly into the two slots. The two slots can have a slot depth into the mass body greater than the groove depth. Each slot can be formed partly into the groove surface inward of a respective groove wall of the two groove walls and can have a respective recessed segment that extends partly into the mass body laterally outward beyond the respective groove wall.

In one example, the wheel balancing weight can have two blind slots. The two slots can have a finite slot depth into the mass body greater than the groove depth. Each slot can be formed partly into the groove surface inward of a respective groove wall of the two groove walls and can have a respective recessed segment that extends partly into the mass body laterally outward beyond the respective groove wall.

BRIEF DESCRIPTION OF THE DRAWINGS

Objects, features, and advantages of the present invention will become apparent upon reading the following description in conjunction with the drawing figures, in which:

FIG. 1 shows a perspective view of one example of a mass body for a wheel balancing weight according to the teachings of the present invention and with blind bores formed in a surface of the body.

FIG. 2 shows a perspective exploded view of the mass body of FIG. 1, after a groove is formed in the same surface of the body, and shows one example of an attachment clip ready to install on the body.

FIG. 3 shows a perspective view of an assembled wheel balancing weight including the mass body and attachment clip of FIG. 2 according to the teachings of the present invention.

FIG. 4 shows an opposite perspective view of the assembled wheel balancing weight of FIG. 3.

FIG. 5 shows a cross-section taken along line 5-5 of the assembled wheel balancing weight of FIG. 3.

FIG. 6 shows a perspective view of another example of an attachment clip for a wheel balancing weight.

FIG. 7 shows a perspective view of an assembled wheel balancing weight including the attachment clip of FIG. 6 secured in a groove of a mass body.

FIG. 8 shows one example of a cross-section taken along line 8-8 of the assembled wheel balancing weight of FIG. 7 and including one example of a mass body and groove structure.

FIG. 9 shows an alternate example of a cross-section, similar to that of FIG. 8, but of the attachment clip of FIG. 6 assembled to a mass body having a different groove structure.

FIG. 10 shows a perspective view of another example of an attachment clip for a wheel balancing weight according to the teachings of the present invention.

FIG. 11 shows an assembled wheel balancing weight including the attachment clip of FIG. 10 secured to a mass body.

FIG. 12 shows a perspective exploded view of another example of a wheel balancing weight according to the teachings of the present invention.

FIG. 13 shows a perspective view of the attachment clip for the wheel balancing weight of FIG. 12.

FIG. 14 shows a perspective view of another example of an assembled wheel balancing weight according to the teachings of the present invention.

FIG. 15 shows a perspective exploded view of another example of a wheel balancing weight according to the teachings of the present invention including further examples of an attachment clip and a mass body.

FIG. 16 shows a frontal view of the attachment clip of FIG. 15.

FIG. 17 shows an assembled wheel balancing weight including the mass body and attachment clip depicted in FIG. 15.

FIG. 18 shows another example of a mass body constructed in accordance with the teachings of the present invention and configured for the wheel balancing weight of FIGS. 15 and 17.

FIG. 19 shows a perspective view of another example of an attachment clip constructed in accordance with the teachings of the present invention and configured for the wheel balancing weight of FIGS. 15 and 17.

FIG. 20 shows a bottom edge view of the attachment clip of FIG. 19.

FIG. 21 shows a cross-section taken along line 21-21 of the wheel balancing weight of FIG. 17, but with the attachment clip of FIGS. 19 and 20 and prior to crimping the mass body material.

FIG. 22 shows the wheel balancing weight of FIG. 21 after crimping the mass body material to secure the attachment clip in place.

DETAILED DESCRIPTION OF THE DISCLOSURE

The disclosed wheel balancing weights solve or improve upon one or more of the above-noted and/or other problems and disadvantages with prior know wheel balancing weights. In one example, the disclosed wheel balancing weights have tabs or ears that project outward from sides of the attachment portion of the clip. In one example, the disclosed wheel balancing weights have a groove in a mass body to accept the attachment portion of a clip and have blind bores in the mass body adjacent the groove to receive the tabs or ears. In one example, the blind bores are formed deeper into the mass body than the groove. In one example, the tabs or ears are bent or formed so as to extend into the blind bores. In one example, the disclosed wheel balancing weights have a clip with an attachment portion that has tapered sides that are not parallel to one another. In one example, the disclosed wheel balancing weights have tapered sides on the clip attachment portion and have tabs or ears carried on the tapered sides. In one example, the disclosed wheel balancing weights have a clip with an attachment portion that has features formed out of plane with a plane of the attachment portion. In one example, the disclosed wheel balancing weights have a mass body with a grove for receiving the attachment portion and blind recesses configured to receive the recess on the attachment portion. The foregoing and other wheel balancing weights disclosed herein provide new clip to mass body attachment structures and methods to improve retention of the clip to the mass body. These and other objects, features, and advantages of the present invention will become apparent to those having ordinary skill in the art upon reading this disclosure.

A typical steel wheel weight has two components; the mass or body (i.e., mass body herein) and the attachment clip. Both components are typically formed of a metal such as steel. A coil of steel for the mass bodies can be fed into a press that stamps the appropriate characters, weight information, and the like into a surface of the body and cuts multiple mass bodies from the coil to length. The mass bodies then go to a second operation where the radius in the mass bodies is formed and the clip pockets or grooves are cut out. The mass bodies then typically get coated or otherwise surface treated and then conveyed on to assembly for mounting and securing the attachment clips to the bodies.

The terms front, back, side, rear, top, bottom, exposed, and the like are uses herein for reference. Use of these terms and similar terms throughout the description is merely to make the relative relationship of the various portions of the components easier to understand and describe. Use of these and like terms also may be used herein in relation to the environment in which the disclosed wheel balancing weights are used, such as "back" referring to the side of the mass body facing a wheel rim in use and "front" or "exposed" referring to the side of the mass body facing away from a wheel rim in use. These terms and like terms are not intended to limit the scope of the invention in any way, unless specifically stated elsewhere herein.

Turning now to the drawings, a wheel balancing weight according to the teachings of the present invention has an attachment clip that can be attached, mounted, or secured to a mass body using a unique clip and pocket or groove construction. With reference to FIGS. 1 and 2, a mass body 20 and an attachment clip 22 are shown. The mass body 20 is an elongate element with a top side 24, a bottom side 26, two opposed ends, 28, and two opposed surfaces or sides 30, 32. The surface 30 is denoted herein as the front or exposed side 30 and the opposite surface or side 32 is denoted herein as the rear or back side 32 on the mass body 20. The top and bottom sides 24, 26 can transition into the front and back sides 30, 32 at curved, rounded, or smooth corners as shown, or at sharp, squared off corners, if desired.

The mass body 20 in this example can be formed first having a linear configuration as shown in FIG. 1. A pair of blind bores or slots 34 is provided in the front side 30 into the body to a first depth or slot depth into the body material. The blind slots 34 can be formed, coined, cut out, punched, milled, drilled, or otherwise created using any suitable manufacturing method. The blind slots 34 are spaced apart from one another along the mass body 20. As shown in FIG. 1, the pair of blind slots 34 can be formed in a mirror image canted or angled orientation in the linear mass body 20, as shown in FIG. 1. In this example, the blind slots are shown as having a generally elongate oval shape. However, the shape and configuration of the blind slots 34 can vary from this particular example and yet function as intended. Also, though the blind slots 34 in this example only extend part way through the mass body, the slots can be open slots and extend all the way though the thickness of the body from the front surface to the back surface, if desired.

A clip pocket or groove 36 is also formed in the front side 30 of the mass body 20. In this example, the groove 36 is formed into the mass body 20 and has a groove surface 42 that lies at a second depth or groove depth that is less than the first depth of the blind slots 34. The groove 36 can be created by forming, cutting, milling, coining, or any other suitable manufacturing process. Top and bottom edges 38, 40 of the groove surface 42 open partly into the top side 24 and bottom side 26, respectively, or into the curved top and bottom rounded corners of the body in this example. The groove surface 42 is essentially flat or planar in this example and thus is a flat groove cut into the front side 30 of the mass body and extending the height of the body. The groove 36 also has a finite width that is less than a width of the mass body between the ends 28. The groove width is defined by groove walls 44 or groove edges that are laterally spaced apart across the groove surface 42. In this example, the groove walls 44 are generally linear and generally parallel to one another, although they need not be, as discussed later herein. The groove walls 44 are also generally perpendicular to the groove surface 42, although, again, the walls can be angled or tapered toward or away from one another, if desired.

In one example, the mass body 20 can be formed as part of a long or continuous coil of material, such as steel. The individual mass bodies can be separated from the coil at a cut off station. In this example, at any time before the clip pocket or groove 36 is formed, the blind bores or slots 34 can be coined or otherwise formed into the front surface or ide 30 of the body 20. This can be done in the cut-off station, where the wire or steel coil is on its side lying flat. The first depth of the blind slots 34 is less than the thickness of the mass body 20, but a little deeper that the second depth of the clip pocket or groove 36. As shown in FIGS. 1 and 2, the blind slots 34 can be formed prior to the clip pocket or groove 36 being formed. However, the reverse is certainly possible as well, if desired.

In this example, the mass bodies 20 can then go to a forming station where the desired curvature or bend radius is added to the mass body 20, as shown by the difference in the mass body between FIG. 2 and FIG. 1. As noted above, the blind slots 34 can be formed at a mirror image angle relative to one another in the linear mass body 20 (see FIG. 1), instead of being aligned parallel to one another. When the mass body 20 is formed to the desired curve or radius, the blind slots can become straight or aligned with one another (see FIG. 2). After the mass body 20 is formed or curved, the clip groove 36 can be cut, as in this example. It is also possible that the groove 36 is formed before the mass body 20 is bent or at the same time that the radius is added to the mass body. It is further possible that the blind slots are formed aligned and linear in the straight, elongate mass body and then become misaligned in the formed or curved mass body. The later described elements of the attachment clip can be configured to match.

The location of the two blind slots 34 can be such that they intersect with a respective one of the groove edges or walls 44 of the clip groove 36. Thus, the groove 36 can be cut so as to intersect or bisect each of the blind slots 34, as shown in FIG. 2. This will result in part of each blind slot 34 being located inside of the groove 36 and into the groove surface 42 and part of each blind slot being formed beyond the respective wall 44 and into the mass body material. This creates a small, deep recess segment 46 of each blind slot 34 that extends laterally beyond each of the groove walls 44. The depth of the deep recesses is the first depth of the blind slots, which is greater than the second depth of the groove surface 42 of the clip groove 36. The width defined between the deep recess segments 46 is also wider than the width between the groove walls 44.

Also with reference to FIG. 2, the attachment clip 22 in this example has a clip portion 50 that is U-shaped across a width of the attachment clip. The clip portion 50 is configured to attach to a wheel rim or other part of a wheel and tire assembly, as is known in the art. The attachment clip 22 also has an attachment portion 52 that extends from one edge 54 of the clip portion 50. The attachment portion 52 in this example is generally planar and has a free bottom end 56 and an opposite top end connected to the edge 54 of the clip portion 50. In this example, the attachment clip 22 is a steel or metal one-piece structure that is die-cut and metal formed to create the attachment clip shape. This results in an integral continuous joint between the clip and attachment portions at the edge 54.

The attachment portion 52 in this example also has a pair of opposed side edges 60. Each side edge 60 is at least partly linear and parallel to and spaced laterally apart from the same segment on the other side edge. However, a protruding element 62, such as a tab, wing, protrusion, ear or the like, protrudes laterally outward from each of the side edges 60 in this example. Thus, the protruding elements 62 protrude in opposite directions from one another. The side edges 60 of the attachment portion 52, and particularly those portions that do not carry the protruding elements 62, need not be straight or parallel to one another, as is discussed further below.

The components can then be conveyed to, moved to, or otherwise placed in an assembly or placing station wherein the attachment portion 52 of the attachment clip 22 can be positioned or placed in the clip pocket or groove 36. The attachment portion 52 is sized to fit between the groove walls 44 and to lay against the groove surface 42 when the attachment clip 22 is mounted or attached to the mass body 20. The protruding elements 62 are sized, positioned, and shaped to seat in the deep recess segments 46 when the attachment portion 52 is inserted in the groove or clip pocket. See FIGS. 2 and 3. At this station, or at the next station, the protruding elements can be pushed or bent down so that at least part of the protruding element lies out of plane relative to a plane of the attachment portion 52 and further into the deep recess segments 46. The particular size and shape of the attachment portion 52, as well as the protruding elements 62, can vary from the example shown in FIGS. 1-3. The particular shape and contour of the mass body 20 and clip portion 50 of the attachment clip 22 can also vary from the example shown and described.

At the assembly machine, the attachment portion 52 is secured to the mass body 20. In this example, a crimp tool can forcibly contact and deform or crimp material of the mass body 20 adjacent the groove side walls 44 of the clip groove 36. The crimp blades can push material of the mass body 20 toward and into the groove 36 and over and onto the edges 54 of the clip attachment portion 52, as shown in FIGS. 3 and 5. However, the crimp blades can be configured, as noted above, to also simultaneously push or bend the protruding elements 62 down into the deeper recess segments 46 at this station, if desired. This may also be designed to occur as mass body material 64 flows inward toward the groove 36 and down into the groove. The flowed or worked material 64 may function to also bend the protruding elements 62 into the deeper recess segments 46 during the crimping process. As shown in FIG. 3, the flowed or worked material 64 overlies the attachment portion 52 along the edges 54 and overlies the protruding elements 62 to secure the attachment clip 22 to the mass body 20, as shown in FIG. 5.

FIGS. 3-5 thus illustrate an assembled wheel balancing weight 66 that is constructed in accordance with one example of the teachings of the present invention. The protruding elements 62 and deeper recess segments 46, along with the overlying flowed or worked material 64, create an additional anchor point or anchor tab at each side of the attachment portion 52 of the attachment clip 22. The protruding elements 62 anchor the attachment portion 52 in the top side to bottom side direction parallel to the groove surface 36. The flowed or worked material 64 anchors the attachment portion 52 to the mass body in a direction perpendicular to the groove surface. The groove walls 44, the side edges 54 of the attachment portion 52, and the protruding elements 62 and blind slots 34 anchor the attachment portion in a side to side or lateral direction. Thus, in this example, the attachment clip is securely attached to the mass body and won't move or slip in any direction.

The 'winged' attachment portion, i.e., the attachment portion 52 with the protruding elements 62, and the blind slot design also provide an additional manufacturing benefit. The protruding elements 62 and the corresponding deep recess segments 46 and blind slots 34 help to perfectly align the attachment clip 22 to the mass body 20 in the proper or normal arrangement during assembly. This eliminates the need for separate assembly fixtures (nests) on the assembly machine that otherwise would become much more complex.

The wheel balancing weight 66 disclosed in this example as shown in FIGS. 1-5 can be used on a variety of different wheel weight configurations. The same coined slots can be formed in a wide variety of different mass body shapes, sizes, and materials. The slots of FIG. 1 can be formed in the mass bodies prior to cutting the clip groove or pocket of FIG. 2 in the mass bodies. The clips can be formed having a height offset along the side edges between the two protruding elements and the blind slots can be formed having an off-set to match. Thus, one side of the clip and groove would not be a mirror image of the other. Likewise, the blind slot shape on one side, and thus the shape of the protruding element can be different from those on the other side. These also need not be mirror images of the each other. It is also possible that the blind slots are not "blind" but instead the slots can extend completely through the mass body thickness. It is further possible to provide two or more protruding elements on one or both side edges of the attachment portion on the clip. The number of blind slots or slots can be provided to match the number of protruding elements. Also, the worked material at the edges of the groove can be swaged, crimped, stamped, or otherwise suitably worked to deform the mass body material onto the side edges of the attachment clip.

FIGS. 6-9 illustrate another example of a wheel balancing weight 68 that is constructed in accordance with the teachings of the present invention. In this example, the wheel balancing weight 68 has an attachment clip 70 with a clip portion 72 and an attachment portion 74. The attachment portion 74 has side edges 76 that are again linear or straight in plan view. However, when viewed on edge as shown in FIG. 6, the attachment portion 74 has "pyramids" or V-shaped indents, i.e., protruding elements 78 that are formed in the edges 76. This type of protruding element can be stamped into the edges 76 of the attachment portion 74. The depth of the attachment portion 74 is greater than the material thickness of the attachment portion stock material at the location of the indentations, V-shaped pyramids, or protruding elements 78 along the edges 76.

In other examples, protruding elements, such as the elements 78, can also extend laterally outward beyond the side edges of the attachment portion, if desired. Also, the protruding elements could be formed at the same time that the attachment portion is secured by a crimping tool or other tool, instead of at the time of forming the attachment clip.

The attachment clip 70 is mated to a mass body 80 by inserting the attachment portion 72 into a clip groove or pocket 82, as shown in FIGS. 7 and 8, to form the wheel balancing weight 68. The groove 82 has a groove surface 84 that can have deeper recessed regions 86 or blind slots along and adjacent side walls 88 of the clip groove 82. These deeper recessed regions 86 in the clip pocket or groove 82 can have a first depth or slot depth greater than a second depth or groove depth of the groove surface 84 in order to accommodate the pyramids or V-shaped indentations or protruding elements 78. The protruding elements 78 in this example taper and decrease in depth from the edges 76 on the attachment portion 72. The deeper recessed regions 86 can mirror this taper angle and can be formed as one angled, ramped, cut-out along the height of the groove (i.e., relative to the height of the mass body). Alternatively, the deeper recessed regions 86 can be formed as multiple recesses adjacent each groove wall 88, one each shaped, angled, and sized to mate with a respective one of the indentations or protruding elements 78 on the attachment portion 72 of the clip 70. For a representation of either of the aforementioned deeper recessed region 86 example, see FIG. 8. The angle or taper of the recessed regions 86 can mirror the angle or taper of the protruding elements.

In another alternative, coined slots or a straight (non-angled or ramped) deep groove 90 can be cut deeper into the clip pocket or groove surface 84. The depth of the deep grooves 90 need only be sufficient to accommodate the maximum depth of the protruding elements 78, i.e., the tapered pyramids or V-shaped indentations. This alternate configuration is shown in FIG. 9. Again, the deeper recesses or deep grooves 90 can be formed as one elongate recess along the height of the groove and mass body, or as multiple recesses formed in one-to-one relation to the indentations or protruding elements in the attachment clip.

As shown in FIGS. 8 and 9, the material of the mass body 80 that is adjacent the groove 82 or clip pocket can be swaged, crimped, or otherwise worked to secure the clip to the mass body. As in the prior example, the worked or flowed mass body material 92 will secure the attachment portion 72 of the clip 70 to the mass body 80. The protruding elements 78 will assist in anchoring the attachment clip 70 in any direction to the mass body 80. Also, the number, size, shape, and configuration of the pyramids, V-shaped indents, indentations, or protruding elements can vary from the example shown. The indentations can be of a different shape, depth, and/or the like.

FIGS. 10 and 11 illustrate another example of a wheel balancing weight 98 that is constructed in accordance with the teachings of the present invention. In this example, the wheel balancing weight 98 has an attachment clip 100 with an attachment portion 102 of a trapezoidal shape and no protruding elements. The earlier described examples employed a generally rectangular shaped attachment portion. The attachment portion 100 is generally flat or planar. However, the attachment portion 102 in this example has opposed side edges 104 that are not parallel to one another, as in the examples described above. Instead, the attachment portion 102 is wider along a remote or free edge or end 106 that is spaced from a clip portion 108 of the attachment clip 100. The attachment portion 102 is narrower where it is joined to an edge 110 of the clip portion. Thus, the side edges 104 are tapered or angled relative to one another and closer to one another nearer the clip portion 108 and further apart nearer the free end 106.

A mass body 112 has a like-shaped groove 114 or clip pocket that is cut in a front side 116 therein. The groove 114 has groove walls 118 spaced apart from one another across the width of the groove and along the sides of the groove. The groove walls 118 in this example mirror the edges 104 of the attachment portion 102 on the clip 100. In other words, the groove walls 118 are also not parallel with one another. Instead, the walls 118 are tapered and are closer to one another nearer a top side 120 of the mass body 112 and are further apart from one another nearer a bottom side 122 of the mass body. The groove walls 118 are thus angled in plan view, tapering away from one another to match the shape and size of the trapezoid shape of the clip attachment portion 102, as shown in FIG. 11. The mass body 112 can then be crimped, swaged, or otherwise worked to secure the attachment portion 102 to the mass body. As shown in FIG. 11, flowed or worked mass body material 124 overlies the edges 104 of the clip attachment portion 102 to secure the attachment portion in the groove 114.

The attachment portion shape on the attachment clip 100 in this example can assist in improving retention between the clip and the mass body 112 and in anchoring the attachment clip to the mass body. With reference to FIGS. 10 and 11, the edge 110 of the clip portion 108 is wider than the upper end of the attachment portion 106. This creates shoulders 126 on the ends of the edge 110 beyond the side edges 104 of the attachment portion 106. These shoulders 126 bear against the top side 120 of the mass body 112 laterally beyond the width of the groove 114 in the assembled wheel balancing weight 98. The trapezoid shape keys the attachment portion 106 in the groove 114 and prevents the attachment clip from pulling away from the mass body 112 in a direction parallel to the groove surface and toward the top side 120. The shoulders 126 can bear against the top side 120 of mass body and prevent the attachment clip from moving parallel to the groove surface but in the opposite direction toward the bottom side 122. It may be desirable to leave a space or gap between the clip portion 108 and top side 120 to allow for some resiliency in the clip portion during installation on a wheel rim. The shoulders 126 can be sized and position so as to create and maintain such a gap. These shoulders 126, though not specifically described, are also found on the earlier described attachment clip 22 of the first embodiment and are identified in FIG. 2. The gap between the clip portion and top side of the mass body, though also not specifically described in the earlier embodiments, is shown in FIGS. 3, 4, and 14. No such shoulders are provided on the attachment clip 70 of the intervening embodiment, though they certainly could be provided.

FIGS. 12 and 13 illustrate yet another example of a wheel balancing weight 130 in accordance with the teachings of the present invention. In this example, the wheel balancing weight has a mass body 132 that is substantially identical to the mass body 20 described above, including having blind slots 34 and deeper recess segments 46. The only difference in this example is that the body 132 has groove walls 134 that are not parallel to one another. The remaining portions of the mass body 132 are the same as the mass body 20 and are identified in the drawings by the identical reference numbers. In this example, the groove walls 134 are tapered, the same as in the previously described mass body 112.

Likewise, the wheel balancing weight 130 has an attachment clip 136 that is also substantially identical to the attachment clip 22 described above, including the protruding elements 62. The only difference in this example is that the attachment clip 136 has an attachment portion 138 with side edges 140 that are not parallel to one another. The remaining portions of the attachment clip 136 are the same as the clip 22 and are identified in the drawings by the identical reference numbers. In this example, the side edges 140 are tapered, the same as in the previously described attachment clip 100.

The wheel balancing weight 130 is shown and described herein to illustrate that features of the various embodiments described herein may be combined with one another, as noted above and altered from the specific features disclosed above for a particular embodiment. The wheel balancing weight 130 essentially combines the anchoring features of the wheel balancing weights 66 and 98.

In another example, a wheel balancing weight can be manufactured having a trapezoid shaped attachment portion, such as that in the example of FIGS. 10 and 11, and different protruding elements. For example, the attachment portion could have linear edges in plan view and have V-shaped, pyramid shaped, or corrugated protruding elements of the example of FIGS. 6-9 in combination with the trapezoid shape.

FIG. 14 shows yet another example of a wheel balancing weight 150 wherein flowed or worked material 152 of a mass body 154 has been crimped in a curved or half-moon shape by a suitably crimping tool. In this example, the wheel balancing weight 150 has an attachment clip 156 secured to the mass body 154, each of which can be identical to those described above for the wheel balancing weight 66. The crimping tool need not be a straight edge or knife edge, but instead can also be a curved edge to conformingly wrap the worked or flowed material of the mass body around tabs or other protruding elements and onto an attachment portion 158 of the clip 156. Alternatively, the attachment portion 158 can have straight side edges or other side edge configurations.

FIGS. 15-17 illustrate yet another example of a wheel balancing weight 160 that is constructed in accordance with the teachings of the present invention. In this example, the wheel balancing weight has a mass body 162 that is substantially similar to the mass body 112 discussed above with reference to FIGS. 10 and 11. The mass body 162 in this example again has a groove 164 or clip pocket with a trapezoid-like shape that is cut or formed in a front side 166 of the body. The groove 164 has groove walls 168 spaced apart from one another across the width of the groove and along the sides of the groove. The groove walls 168 are again not parallel with one another. Instead, the walls 168 are tapered or diverge from one another whereby the groove walls are closer to one another nearer a top side 170 of the mass body 162 and further apart from one another nearer a bottom side 172 of the mass body. The groove walls 168 are thus angled in plan view and taper or diverge away from one another from the top side 170 to the bottom side 172 of the mass body 162.

In this example, the groove 164 again has a groove surface 174 that lies at a groove depth into the front side 166 of the mass body 162. The groove 164 or clip pocket can be stamped, punched, die cut, or otherwise formed in the mass body 162, as described previously. However, the groove 164 in this example also includes an optional undercut 176 within the groove 164 and greater than the groove depth. One of the undercuts 176 is formed along each groove wall 168 into the groove surface 174 at the base of the wall. Each undercut 176 is thus formed into the groove surface 174 at the juncture between the respective groove wall 168 and the groove surface. The purpose and function of the undercuts 176 is described in U.S. Pat. No. 9,004,611, which is commonly assigned to the assignee of the present invention. The undercuts 176 can be v-shaped notches (as in this example), rounded notches or depressions, or the like.

In this example, the wheel balancing weight 160 also has an attachment clip 180 that is substantially similar to the attachment clip 100 described above and shown in FIGS. 10 and 11. The attachment clip 180 in this example thus has an attachment portion 182 that also has a trapezoidal shape. However, the attachment portion 182 in this example includes "protruding" elements as described below, whereas the attachment clip 100 does not. The attachment portion 182 in this example is again generally flat or planar. The attachment portion 182 has opposed side edges 184 that are not parallel to one another. The attachment portion 182 is thus wider along a remote or free edge or end 186 that is spaced from a clip portion 188 of the attachment clip 180. The attachment portion 182 is narrower where it is joined to an edge 190 of the clip portion 188. The side edges 184 are thus also tapered or angled so as to diverge relative to one another and are closer to one another nearer the clip portion 188 and further apart nearer the free edge 186.

As shown in FIGS. 15 and 16, the "protruding" elements are formed as notches or cutouts 192 that protrude into the side edges 184 of the attachment portion 182 instead of out from or out of plane relative to the attachment portion, as in the previous examples. The notches or cutouts 192 can be square, rectangular, rounded, semi-circular (as in this example), V-shaped, or the like. This type of protruding element can be stamped or die cut from the material at the side edges 184 of the attachment portion 182, or the like. In this example as in some of the earlier described examples, there can be a first protruding element or notch 192 in a first of the side edges 184 and a second protruding element or notch 182 in a second of the side edges 184 on the attachment portion 182. As shown in this example, however, the first and second protruding elements of notches 192 are offset relative to one another across the attachment portion. In other words, the first notch 192 is at a first distance from the free edge 186 and the second notch is at a second distance, which is different than the first distance. This difference D is shown in FIG. 16 and can vary in different examples. The protruding elements, such as the tabs, pyramids, or the like, in the earlier described examples can be offset from one another as well, if desired.

As with the prior examples, the mass body 162 can then be crimped, swaged, or otherwise worked to secure the attachment portion 182 to the mass body. As shown in FIG. 17, flowed or worked mass body material 194 overlies the side edges 184 of the clip attachment portion 182 to secure the attachment portion in the groove 164 on the mass body 162. The crimped or flowed material can overlie portions of or all of the side edges 184 of the attachment portion 182 and can also overlie and seat within the notches or cutouts 192.

FIG. 18 shows a modified example of the wheel balancing weight of FIGS. 15-17. In this example, the mass body 162 can include shaped protrusions 196 that protrude from the groove walls 168. The shaped protrusions 196 can have a profile shape that matches that of the notches or cutouts 192 in the side edges of the attachment portion 182. When assembled, the protrusions 196 can seat in the notches or cutouts 192. This can precisely position and key the attachment clip 180 to the mass body in concert with the mating trapezoid shapes of the attachment portion 182 and groove 164. Again, the attachment portion shape on the attachment clip 180 in this example can assist in improving retention between the clip and the mass body 162 and in anchoring the attachment clip to the mass body. When the mass body material is crimped, the material from the protrusions 196 can more easily flow onto the attachment portion 182 adjacent the notches or cutouts 192, assisting in creating a very strong and durable attachment to the mass body 162.

FIGS. 19-22 show another modification that can be provided on any one of the earlier described wheel balancing weight examples. In this example, the modification is shown on a wheel balancing weight 200 that is substantially similar to the weight 160. Like reference numbers in FIGS. 19-22 depict like elements to those found on the weight 160 depicted in FIGS. 15-17. In this example, the wheel balancing weight 200 has a mass body 162 that is or can be identical to the mass body of the weight 160. The wheel balancing weight 200 has an attachment clip 202 that is substantially the same as the attachment clip 180. However, in this example, the attachment clip 202 has an attachment portion 204 with opposed side edges 206 that are modified from previous examples.

The side edges 206 in this example have a chamfered or tapered edge profile, when viewed on edge as shown in FIGS. 19 and 20. The chamfer angle of the edge profile on the side edges 206 can vary in different examples. With reference to FIG. 21, the chamfered edge profile on the side edges 206 would not have any affect when the attachment portion 204 of the clip 202 is inserted into the groove 164 on the mass body 162. However, as depicted in FIG. 22, after crimping, the flowed or worked material of the groove walls 168 and mass body 162 can more closely flow over the side edges 206. This can create more intimate contact between the side edges 206 and the worked or flowed material, which can result in a more secure attachment to the mass body. The tapered or chamfered profile edge on the side edges of the attachment portion can be used on virtually any of the wheel balancing weight examples disclosed and described herein.

In each of the disclosed wheel balancing weight examples discussed above, the attachment clip and mass body are configured to provide a secure clip to body attachment structure that retains the clip in the groove in all three X, Y, and Z axes. The attachment portions disclosed herein are each keyed and/or mechanically retained in the groove in the side-to-side groove direction between the groove walls, in the vertical direction between the top and bottom side of the mass bodies, and in a fore-aft direction toward and away from the groove surface.

Although certain wheel balancing weights, components for such weights, and methods of manufacturing such weights have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A wheel balancing weight comprising:
   an attachment clip having a clip portion configured to attach the wheel balancing weight to a vehicle wheel and having a generally flat or planar attachment portion of a trapezoidal shape with a pair of opposed side edges;
   the attachment portion having one end joined to an edge of the clip portion and having a free edge remote or spaced from the one end and from the edge of the clip portion, the attachment portion being wider at the free edge and being narrower at the one end, the side edges being tapered or angled relative to one another and closer to one another nearer the one end and the clip portion and further apart nearer the free edge;
   a mass body having a front side with a like-shaped groove or clip pocket that is cut in the front side;
   the groove has groove walls spaced apart from one another across the width of the groove and along the sides of the groove, wherein the groove walls mirror the edges of the attachment portion on the clip, to match the shape and size of the trapezoid shape of the clip attachment portion; and
   flowed or worked mass body material that overlies the edges of the attachment portion to secure the attachment portion in the groove,
   wherein the edge of the clip portion is wider than the one end of the attachment portion, creating shoulders on the ends of the edge beyond the side edges of the attachment portion, the shoulders disposed outside of the groove and bearing against the top side of the mass body laterally beyond the width of the groove in the assembled wheel balancing weight and therefore preventing the attachment clip from moving parallel to the groove surface but in the opposite direction toward the bottom side.

2. A wheel balancing weight according to claim 1, wherein the mass body is crimped, swaged, or otherwise worked to secure the attachment portion to the mass body.

3. A wheel balancing weight according to claim 1, wherein a space or gap is left between the clip portion and the top side to allow for resiliency in the clip portion during installation on a wheel rim.

4. A wheel balancing weight comprising:
- an attachment clip having a clip portion configured to attach the wheel balancing weight to a vehicle wheel and having a generally flat or planar attachment portion of a trapezoidal shape and no protruding elements with a pair of opposed side edges;
- the attachment portion having one end joined to an edge of the clip portion and extending from the edge and terminating at a free edge that is remote or spaced from the one end and the edge of the clip portion, the attachment portion being wider along the free edge and being narrower at the one end joined to the edge of the clip portion, the side edges being tapered or angled relative to one another and closer to one another nearer the one end and the clip portion and further apart nearer the free edge;
- a mass body having a front side with a like-shaped groove or clip pocket that is cut in the front side;
- the groove has groove walls spaced apart from one another across the width of the groove and along the sides of the groove, wherein the groove walls mirror the edges of the attachment portion on the clip, wherein the groove walls are also not parallel with one another, but are tapered and are closer to one another nearer a top side of the mass body and are further apart from one another nearer a bottom side of the mass body, the groove walls are angled in plan view, tapering away from one another to match the shape and size of the trapezoid shape of the clip attachment portion; and
- flowed or worked mass body that material overlies the edges of the attachment portion to secure the attachment portion in the groove,
- wherein the edge of the clip portion is wider than the one end of the attachment portion, creating shoulders on the ends of the edge beyond the side edges of the attachment portion, the shoulders disposed external to the groove and bearing against the top side of the mass body laterally beyond the width of the groove in the assembled wheel balancing weight and therefore preventing the attachment clip from moving parallel to the groove surface but in the opposite direction toward the bottom side, and
- wherein the trapezoid shape keys the attachment portion in the groove and prevents the attachment clip from pulling away from the mass body in a direction parallel to the groove surface and toward the top side.

5. A wheel balancing weight according to claim 4, wherein the mass body is crimped, swaged, or otherwise worked to secure the attachment portion to the mass body.

6. A wheel balancing weight according to claim 4, wherein a space or gap is left between the clip portion and the top side to allow for resiliency in the clip portion during installation on a wheel rim.

* * * * *

UNITED STATES PATENT AND TRADEMARK OFFICE
CERTIFICATE OF CORRECTION

PATENT NO.         : 10,024,387 B2
APPLICATION NO.    : 14/807832
DATED              : July 17, 2018
INVENTOR(S)        : Charles Robert McMahon Page 1 of 1

It is certified that error appears in the above-identified patent and that said Letters Patent is hereby corrected as shown below:

On the Title Page

Item (73) Assignee - "Wegman" should be replaced with --Wegmann--.

Signed and Sealed this
Eighteenth Day of September, 2018

Andrei Iancu
*Director of the United States Patent and Trademark Office*